(12) United States Patent
Park et al.

(10) Patent No.: US 9,870,740 B2
(45) Date of Patent: Jan. 16, 2018

(54) LIQUID CRYSTAL DISPLAY DEVICE AND DRIVING METHOD THEREOF

(71) Applicant: Samsung Display Co., Ltd., Yongin, Gyeonggi-Do (KR)

(72) Inventors: Se-Ki Park, Yongin (KR); Yong-Hoon Kwon, Yongin (KR); Bong-Hyun You, Yongin (KR); Joon-Chul Goh, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 101 days.

(21) Appl. No.: 14/734,884

(22) Filed: Jun. 9, 2015

(65) Prior Publication Data
US 2016/0078819 A1   Mar. 17, 2016

(30) Foreign Application Priority Data
Sep. 16, 2014 (KR) .................. 10-2014-0122732

(51) Int. Cl.
*G09G 3/34* (2006.01)
*G06F 3/00* (2006.01)
(Continued)

(52) U.S. Cl.
CPC ............. *G09G 3/342* (2013.01); *G06F 3/005* (2013.01); *G06F 3/013* (2013.01); *G09G 3/3648* (2013.01); *G09G 2320/068* (2013.01); *G09G 2320/0626* (2013.01); *G09G 2320/0686* (2013.01); *G09G 2354/00* (2013.01)

(58) Field of Classification Search
CPC ...... G06F 1/3265; G06F 3/013; G06F 3/0013; G06F 3/005; H04N 21/6582; G09G 5/00; G09G 3/3426; G09G 3/3648; G09G 3/3406; G09G 3/36; G09G 2330/022; G09G 3/342; G02B 3/0025
See application file for complete search history.

(56) References Cited

U.S. PATENT DOCUMENTS 7,415,126 B2   8/2008   Breed et al.
8,698,727 B2   4/2014   Herz et al.
(Continued)

FOREIGN PATENT DOCUMENTS

KR   10-2012-0131561 A   12/2012
KR   10-2013-0119714 A   11/2013
KR   10-2013-0123260 A   11/2013

*Primary Examiner* — Benjamin C Lee
*Assistant Examiner* — Robert Michaud
(74) *Attorney, Agent, or Firm* — H.C. Park & Associates, PLC (57) ABSTRACT

A liquid crystal display panel comprises a backlight unit including an optical assembly and configured to differentiate the liquid crystal display panel into a plurality of blocks and to illuminate light to each of the plurality of blocks; a location sensor configured to sense a location of a user watching the liquid crystal display panel; a backlight controller configured to output a dimming value corresponding to a brightness of each of the plurality of blocks according to a result of sensing by the location sensor; and a backlight driver configured to generate a driving current corresponding to the dimming value of each block and to provide the generated driving current to the backlight unit corresponding to each of the plurality of blocks.

17 Claims, 5 Drawing Sheets

(51) Int. Cl.
*G06F 3/01* (2006.01)
*G09G 3/36* (2006.01)

(56) References Cited

U.S. PATENT DOCUMENTS

| | | | |
|---|---|---|---|
| 2006/0133113 A1 | 6/2006 | Koike et al. | |
| 2007/0002453 A1* | 1/2007 | Munro | B29D 11/00278 359/627 |
| 2008/0130950 A1* | 6/2008 | Miklos | G06F 3/013 382/103 |
| 2009/0021668 A1 | 1/2009 | Cheng et al. | |
| 2010/0295839 A1* | 11/2010 | Nagaya | G06F 1/3265 345/212 |
| 2011/0122057 A1* | 5/2011 | Kim | G09G 3/3426 345/102 |
| 2012/0288139 A1* | 11/2012 | Singhar | G06F 1/3265 382/103 |
| 2012/0299808 A1 | 11/2012 | Lee et al. | |
| 2015/0228226 A1* | 8/2015 | Luebke | G09G 3/3406 345/690 |

\* cited by examiner

LIQUID CRYSTAL DISPLAY DEVICE AND DRIVING METHOD THEREOF

CLAIM OF PRIORITY

This application claims priority to and the benefit of Korean Patent Application No. 10-2014-0122732 filed on Sep. 16, 2014 in the Korean Intellectual Property Office, the entire contents of which are incorporated herein by reference in their entirety.

BACKGROUND OF THE INVENTION

Field of the Invention

The present invention relates to a liquid crystal display device and a driving method thereof.

Description of the Related Art

Liquid crystal displays (LCDs) which have been most widely commercialized in the flat panel display field cannot emit light by themselves, and so in order to emit light, they need a backlight unit (BLU) as an emitting device. Performance of an LCD depends not only on characteristics of the LCD itself but also on the performance of a backlight unit. That is, the performance of an LCD depends on how efficiently the LCD emits light against power consumed, and also on how uniformly the LCD emits light over an entirety of a display screen.

These kinds of backlight units can be classified into direct type backlight units and edge type backlight units depending on where a lamp is disposed.

A direct type backlight unit is a type of backlight unit where light generated from a light source is made uniform using a diffusion plate, and is then transmitted into a liquid crystal panel, whereas an edge type backlight unit is a type of backlight unit where light generated at a side of a light guide panel is reflected by the light guide panel and is transmitted into a liquid crystal panel.

In line with the recent trends of liquid crystal display device modules becoming thinner and lighter, edge type backlight units are being preferred over direct type backlight units, and a technology for forming an optical pattern under a light guide panel to control a path of light being generated from a light source, thereby increasing brightness, is under development.

SUMMARY OF THE INVENTION

Exemplary embodiments of the present invention provide for a liquid crystal display device and method for driving the liquid crystal display which sense a location of a user to compensate for a brightness deviation, thereby providing a uniform brightness.

According to an embodiment of the present invention, there is provided a liquid crystal display panel comprising: a backlight unit including an optical assembly, and configured to differentiate the liquid crystal display panel into a plurality of blocks and to illuminate light to each of the plurality of blocks; a location sensor configured to sense a location of a user watching the liquid crystal display panel; a backlight controller configured to output a dimming value corresponding to a brightness of each of the plurality of blocks according to a result of sensing sensed by the location sensor; and a backlight driver configured to generate a driving current corresponding to the dimming value of each block and to provide the generated driving current to the backlight unit corresponding to each of the plurality of blocks.

The optical assembly may include: a plurality of light source units including at least one light emitting device and configured to emit light; a light guide panel including an incidence surface where light is transmitted from the light source unit, an exit surface emitting the light to the liquid crystal display panel, and a light guide panel facing the exit surface and including a rear surface where a plurality of optical patterns are formed; and an optical sheet disposed on an upper part of the light guide panel and configured to change characteristics of the light emitted from the light guide panel.

The optical pattern may include a micro lens pattern.

The backlight controller may include: a location determiner configured to compare the result of sensing sensed by the location sensor with a reference value, and to determine the user's location; a left/right side block dimming value control determiner configured to determine whether or not to control a dimming value of the backlight unit corresponding to a left side or right side block of the liquid crystal display panel according to a result of determination of the location determiner; a rise current calculator configured to calculate a rise current of the corresponding block according to a result of determination of the left/right side block dimming value control determiner; and a final dimming value per block generator configured to generate a final dimming value of the corresponding backlight unit of each of the plurality of blocks reflecting a value calculated by the rise current calculator therein.

The location sensor may include an eye tracking sensor configured to identify a location of the user's pupil.

The location sensor may measure an angle between the user's pupil and the backlight unit using the eye tracking sensor.

The reference value may include first and second reference values, the first reference value being 75° and the second reference value being 105°.

The rise current calculator may calculate a rise current, Iup, of the corresponding block using math formula 1: $Iup=(Imax-Inormal)/90\times(90-\theta)$ and math formula 2: $Iup=(Imax-Inormal)/90\times(\theta-90)$, a maximum current of each block of the liquid crystal display panel being Imax, an average current of the each block being Inormal, and the user's location being $\theta$.

The rise current calculator may calculate the rise current, Iup, using math formula 1 in response to the user located on a left side of the liquid crystal display panel, and may calculate the rise current, Iup, using math formula 2 in response to the user located on a right side of the liquid crystal display panel.

The backlight controller may increase the brightness of each block of the liquid crystal display panel corresponding to an opposite side of the user's location.

The backlight controller may increase the brightness of all of the blocks of the liquid crystal display panel in response to the user watching the liquid crystal display panel from a left side or right side.

According to another embodiment of the present invention, there is provided a method for driving a liquid crystal display panel, the method including: differentiating the liquid crystal display panel into a plurality of blocks; sensing a location of a user watching the liquid crystal display panel; outputting a dimming value of each block corresponding to a brightness of each of the plurality of blocks according to a result of the sensing; generating a backlight driving current corresponding to the dimming value of each block; and generating light according to the backlight driving current and providing the generated light to the liquid crystal display panel.

The sensing of the user's location may involve identifying a location of the user's pupil and measuring an angle between the user's pupil and the liquid crystal display panel.

The outputting of a dimming value of each block may include: comparing a result of sensing the user's location with a reference value and determining the user's location according to a result of the comparing; determining whether or not to control dimming of a backlight unit corresponding to a left side or right side block of the liquid crystal display panel according to a result of the determination; calculating a rise current of the corresponding block according to a result of the determination of controlling dimming; and creating a final dimming value corresponding to each of the plurality of blocks reflecting the calculated rise current value therein.

The reference value may include first and second reference values, the first reference value being 75°, and the second reference value being 105°.

BRIEF DESCRIPTION OF THE DRAWINGS

Exemplary embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the exemplary embodiments to those skilled in the art.

In the drawing figures, dimensions may be exaggerated for clarity of illustration. It will be understood that, when an element is referred to as being "between" two elements, it can be the only element between the two elements, or one or more intervening elements may also be present. Like reference numerals refer to like elements throughout.

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component, and so forth without departing from the spirit and scope of the present invention. Furthermore, 'and/or' may include any one of or a combination of the components mentioned.

Furthermore, a singular form may include a plural form as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification, including technical and scientific terms, have the same meanings as would be generally understood by those skilled in the related art. The terms defined in generally used dictionaries should be construed as having the same meanings as would be construed in the context of the related art, and unless clearly defined otherwise in this specification, they should not be construed as having idealistic or overly formal meanings.

It is also noted that, in this specification, "connected/coupled" refers to one component not only directly coupling another component but also indirectly coupling another component through an intermediate component. On the other hand, "directly connected/directly coupled" refers to one component directly coupling another component without an intermediate component.

It is also noted that, in this specification, "above" and "on" refers to one layer, film, region, or panel not only directly above or on another layer, film, region, or panel but also indirectly above or on another layer, film, region, or panel through an intermediate component.

Figure 1:
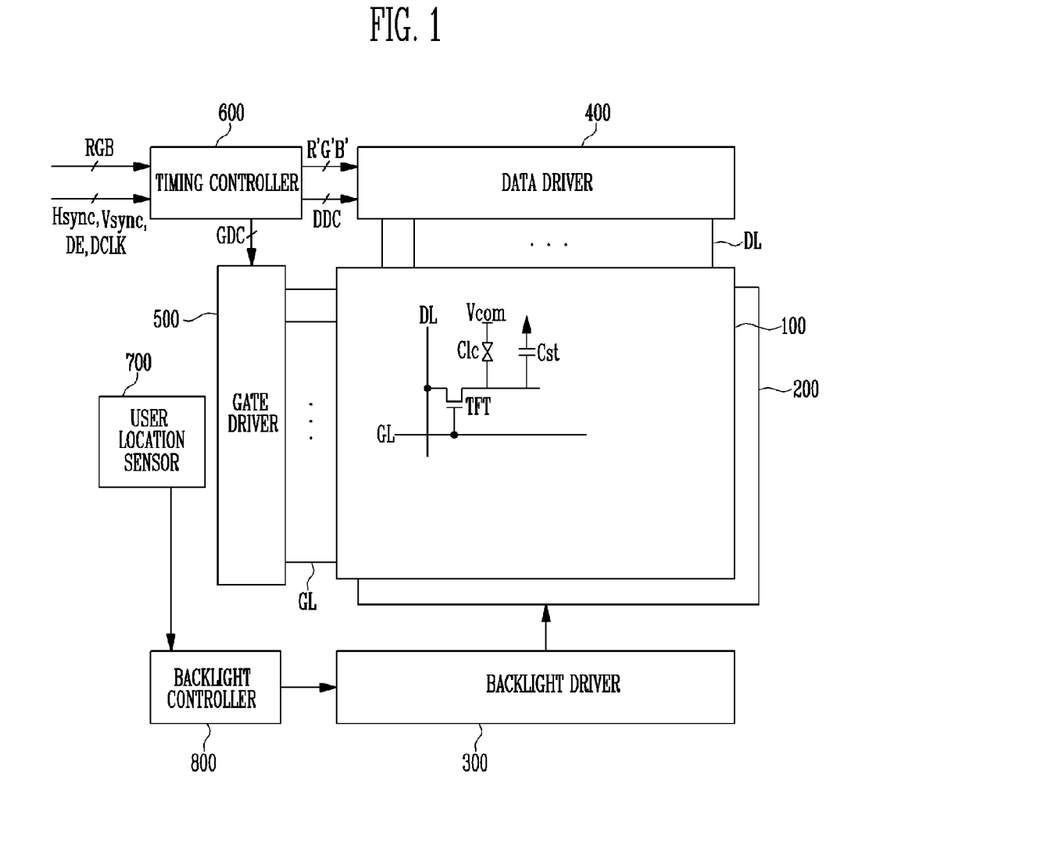
FIG. 1 is a view illustrating a liquid crystal display device according to an embodiment of the present invention.

FIG. 1 is a view illustrating a liquid crystal display device according to an embodiment of the present invention.

Referring to FIG. 1, a liquid crystal display device according to an embodiment of the present invention includes a liquid crystal display panel 100 where a gate line (GL) and a data line (DL) are arranged and which displays an image, a backlight unit 200 that illuminates light to the liquid crystal display panel 100, a backlight unit driver 300 that drives the backlight unit 200, a data driver 400 that drives the data line (DL), a gate driver 500 that drives the gate line (GL), a timing controller 600 that controls the gate driver 500 and data driver 400, a user location sensor 700 that senses a location of a user watching the liquid crystal display panel 100, and a backlight controller 800 that controls the backlight driver 300 according to the location of the user.

The liquid crystal display panel 100 includes two sheets of glass substrates and a liquid crystal layer formed therebetween. The liquid crystal display panel 100 includes liquid crystal cells (Clc) arranged in matrix form of crossover structures of the data lines (DL) and gate lines (GL).

On a lower glass substrate of the liquid crystal display panel 100, data lines (DL), gate lines (GL), thin film transistors (TFT), and storage capacitors (Cst) are formed. The liquid crystal cells (Clc) of the liquid crystal display panel 100 are driven by an electric field between a pixel electrode connected to the thin film transistor (TFT) and a common electrode where a common voltage (Vcom) is supplied.

On an upper glass substrate of the liquid crystal display panel 100, a black matrix, color filer, and common electrode are formed. To each of the upper glass substrate and the lower glass substrate of the liquid crystal display panel 100, a polarizing plate is attached, and an orientation film for setting a pre-tilt angle of the liquid crystal is formed. Herein, the liquid crystal display panel 100 may be differentiated into a plurality of blocks.

The timing controller 600 supplies image data (RGB), inputted from a system board where an external video source is mounted, to the data driver 400. The timing controller 600 generates timing control signals (DDC, GDC) for controlling operational timing of the data driver 400 and gate driver 500 based on timing signals (Vsync, Hsync, DE, DCLK) from the system board.

The data driver 400 latches data under the control of the timing controller 600, converts the latched data into a positive/negative polarity analog data voltage using a positive/negative polarity gamma compensation voltage, and supplies it to the data lines (DL).

The gate driver 500 selects a horizontal line to which a data voltage is to be applied by sequentially outputting a scan pulse and supplying the output scan pulse to the gate lines (GL) under the control of the timing controller 600.

The backlight unit 200 illuminates light including a plurality of light sources, to the liquid crystal display panel 100. The backlight unit 200 may be embodied as either a direct type or edge type backlight unit, but desirably, an edge type backlight unit may be used in the embodiment of the present invention.

The edge type backlight unit 200 has a structure where a plurality of optical sheets and a light guide panel are deposited on a lower part of the liquid crystal display panel 100, and a plurality of light sources are arranged on a side of the light guide panel. Herein, the light sources may be embodied as point light sources such as light emitting diodes (LED).

The backlight driver 300 differentiates the backlight unit 200 into a plurality of blocks by binding some of the plurality of light sources provided in the backlight unit 200, and generates a driving current for driving the light sources provided in each block. Furthermore, the backlight driver 300 adjusts the intensity of a driving current of each block according to control by the backlight controller 800, and provides the adjusted intensity of the driving current of each block to the backlight unit 200.

The user location sensor 700 is located inside the liquid crystal display device, and senses current location of a user. The user location sensor 700 may include a general camera module that photographs in real time the liquid crystal display device in all directions. An eye tracking method may be applied to the user location sensor 700, which is a method of detecting information of a pupil of a user, and calculating the location of the user based on the detected information.

The user location sensor 700 may measure an angle between the user and the liquid crystal display panel 100 using an eye tracking sensor. Specifically, the user location sensor 700 sets up an angle between the user and a front side of the liquid crystal display panel 100, that is, the angle between a pupil of the user and the liquid crystal display panel 100 being perpendicular to each other, as being 90°, and with reference to this angle, the user location sensor 700 measures an angle on a left side and right side of the liquid crystal display panel 100.

For example, when the user's pupil is located on the left side, the user location sensor 700 measures the user's location as having an angle between 0~90°, whereas when the user's pupil is located on the right side, the user location sensor 700 measures the user's location as having an angle between 91°~180°. A result measured by the user location sensor 700 is provided to the backlight controller 800.

The backlight controller 800 determines the user's location based on the result measured by the user location sensor 700, generates a dimming value of each corresponding block reflecting the user's location therein, and provides the generated dimming value to the backlight driver 300.

Detailed explanation on the backlight controller 800 will be made hereinafter with reference to FIGS. 4 and 5.

Figure 2:
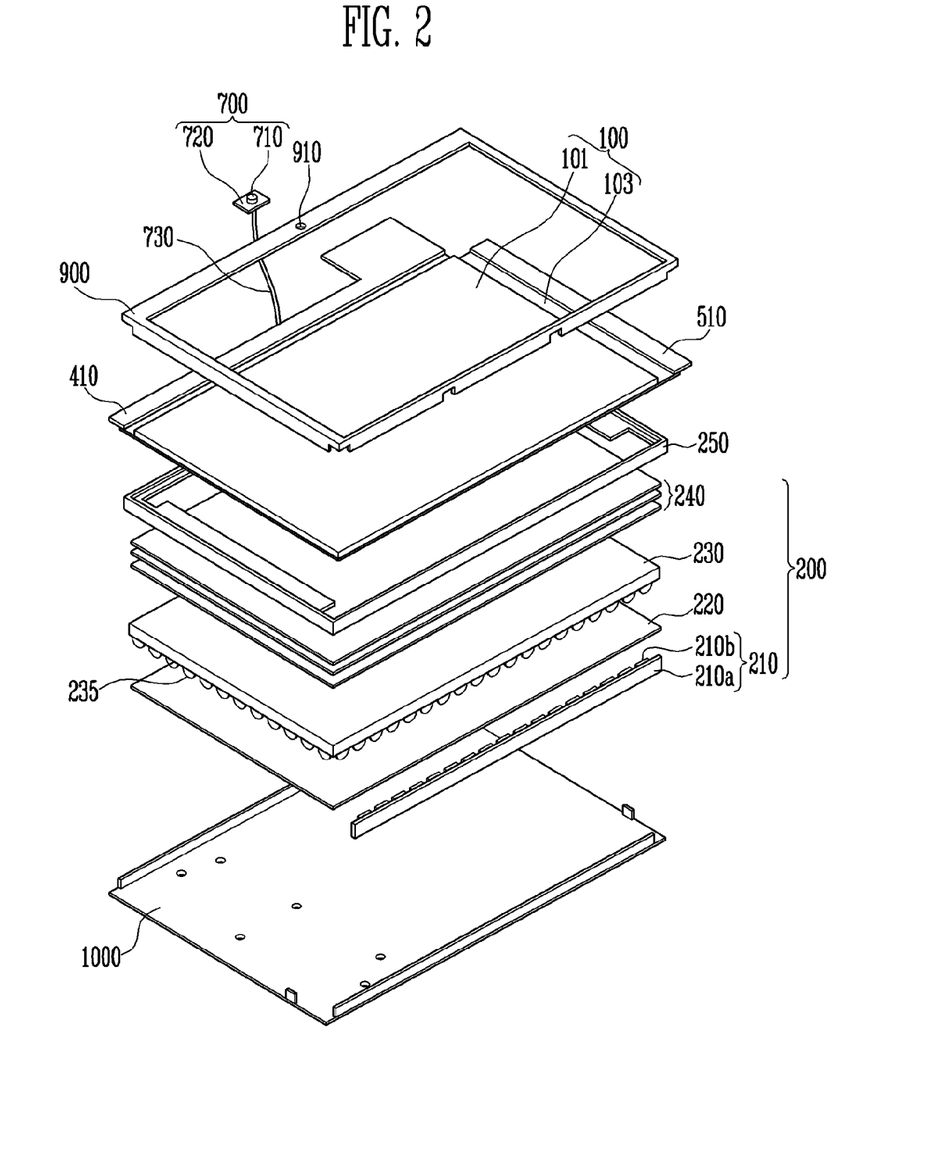
FIG. 2 is a view illustrating an exploded skewed view of the liquid crystal display device of FIG. 1.

FIG. 2 is a view illustrating an exploded skewed view of the liquid crystal display device of FIG. 1.

Referring to FIGS. 1 and 2, the liquid crystal display device includes a liquid crystal display panel 100, a user location sensor 700 for sensing a user's location, a first driving substrate 410 having a data driver 400, a second driving substrate 510 having a gate driver 500, a support main 250 where the liquid crystal display panel 100 is seated, a top case 900 that covers each side end of the liquid crystal display panel 100, a backlight unit 200 that provides light to the liquid crystal display panel 100, and a bottom cover 1000 that mounts the backlight unit 200 and is fastened to a top case 900.

Specifically, the liquid crystal display panel 100 includes a first substrate 103 where a plurality of gate lines (GL) and a plurality of data lines (DL) that define a plurality of pixels formed in regions formed as the gate lines (GL) and the data lines (DL) cross each other, and a second substrate 101 where a color filter, black matrix, and common electrode are formed.

First and second driving substrates 410 and 510, respectively, are electrically connected to the liquid crystal display panel 100 using a TAB (Tape Automated Bonding) film and the like, and when the liquid crystal display panel 100 is being seated on the support main 250, the TAB film is folded and is placed on one side of the liquid crystal display panel 100.

The support main 250 may support and fix the liquid crystal display panel 100, and as each side end of the liquid crystal display panel 100 is seated on a projected section formed on the support main 250, thereby making an inner side of the support main 250 and a side end of the liquid crystal display panel 100 closely contact each other, the module hardness is maintained.

The user location sensor 700 may include a general camera lens part 710 and lens substrate 720. Herein, the user location sensor 700 may include a CCD, CMOS, or eye tracking sensor. Such a camera lens part 710 is electrically connected to a location determiner installed inside a backlight controller 800 through a separately extended signal line 730.

The top case 900 is coupled to an upper part of the support main 250 where the liquid crystal display panel 100 is seated and plays a role of retaining the liquid crystal display panel 100 and preventing the liquid crystal display panel 100 from being dislocated by an impact from outside, and in a lower direction of the liquid crystal display panel 100, the top case 900 is fastened to the bottom cover 1000. In the center of a bezel region of such a top case 900, at least one hole 910 is formed so as to expose the lens part 710 of the user location sensor 700.

The backlight unit 200 provides light to the liquid crystal display panel 100. The backlight unit 200 may include a plurality of optical sheets that efficiently provide light emitted by one or more point light sources and light sources through optical compensation. The backlight unit 200 is disposed on a rear surface of the liquid crystal display panel 100.

The aforementioned light source may be configured as a plurality of light emitting diode packages 210*b* that are one or more point light sources, wherein the light emitting diode packages 210*b* mount one or more LED semiconductor devices and are bonded in a line side by side on the liquid source substrate 210*a*.

Figure 3:
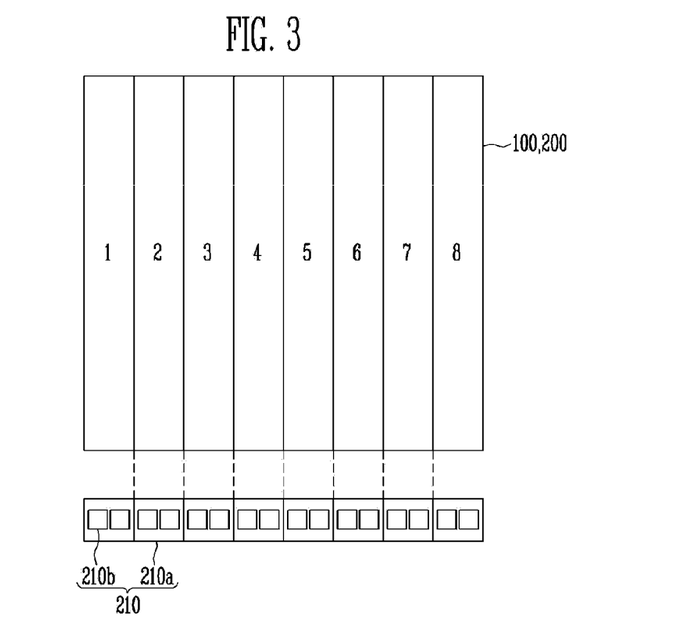
FIG. 3 is a view illustrating a liquid crystal display panel and backlight unit of FIG. 1 differentiated into eight blocks.

The light source substrate 210*a* and the light emitting diode package 210*b* bonded to the light source substrate 210*a* compose the light source unit 210. Such a light source unit 210 may differentiate the light emitting diode packages 210*b* into eight blocks, each consisting of two light emitting diode packages 210*b*, as illustrated in FIG. 3. The backlight unit 200 and liquid crystal display panel 100, where light is illuminated by such a light source unit 210, may also be differentiated into first to eighth blocks (1~8).

In the drawings of the specification, the light source unit 210 is arranged at one side end of the light guide panel 230, but the technological concept of the present invention may also be applied to a backlight unit where a light source unit 210 is arranged at both sides or at all sides of the light guide panel 230 depending on the intentions of the designer.

The light guide panel 230 is a component where light entering from a corner end is transmitted to another side end after repeated reflection and refraction at an exit surface and rear surface of the light guide panel 230, and exits in the liquid crystal display panel 100 direction. The light guide panel 230 may include a dispersing agent to help light proceed.

On the rear surface of the light guide panel 230, an optical pattern 235 may be formed to scatter the entering light. The optical pattern 235 is formed as a collimating micro lens pattern, or it may be formed as a prism form, pyramid form, regular tetrahedron form, hemisphere form, or aspheric form having a different bottom length and height. The prism form may be an asymmetric prism form of which an apex angle is 90 degrees with different left and right angles, wherein a same prism form exists continuously in one direction, and having a one-dimensional form at the other side. Herein, the prism may be a pitch variable prism instead of a continuously existing prism. Other patterns may include regular two-dimensional arrangements, or a random arrangement.

The optical sheet 240 is provided between the liquid crystal display panel 100 and light guide panel 230, and plays a role of diffusing light being induced from the light guide panel 230, collecting the light, and then emitting the collected light to the liquid crystal display panel 100. The optical sheet 240 may consist of one or more diffusion sheets and prism sheets. The diffusion sheet diffuses light being emitted from the light guide panel 230, and the prism sheet collects the light diffused by the diffusion sheet and supplies the light uniformly to the liquid crystal display panel 100.

Herein, generally in the case of a diffusion sheet, one piece of diffusion sheet is provided, but for prism sheets, it is desirable to provide a first prism set and a second prism set where a prism crosses over in x and y axis directions, so as to refract the light in x and y axis directions, thereby improving the straightness of the light.

A reflection plate 220 is provided under the light guide panel 230, and reflects light refracted by the light guide panel 230 and emitted in a downward direction, that is, in a direction opposite to the liquid crystal display panel 100, so that the light can proceed back towards the light guide panel 230.

The aforementioned liquid crystal display panel 100 is seated on a projecting part inside the support main 250, and is coupled to the top case 900 by an upper part of the support main 250, thereby being supported and fixed. Furthermore, after the light source unit 210, the light guide panel 230 and other optical members 220 and 240 are accommodated to the bottom cover 1000 toward the downward direction of the liquid crystal display panel 100 and inside the support main 250, the bottom cover 1000 is fastened to the support main 250 and top case 900, thereby completing the liquid crystal display device as one module.

According to the aforementioned structure, the user location sensor 700 that senses the user's location in a liquid crystal display device according to an embodiment of the present invention may be embedded inside an apparatus structure 900 (top case) and thus be integrated therewith. Hereinafter, with reference to the drawings, controlling a dimming value will be explained in detail for each block (1~8) of the liquid crystal display panel 100 according to the user's location sensed in the user location sensor.

Figure 4:
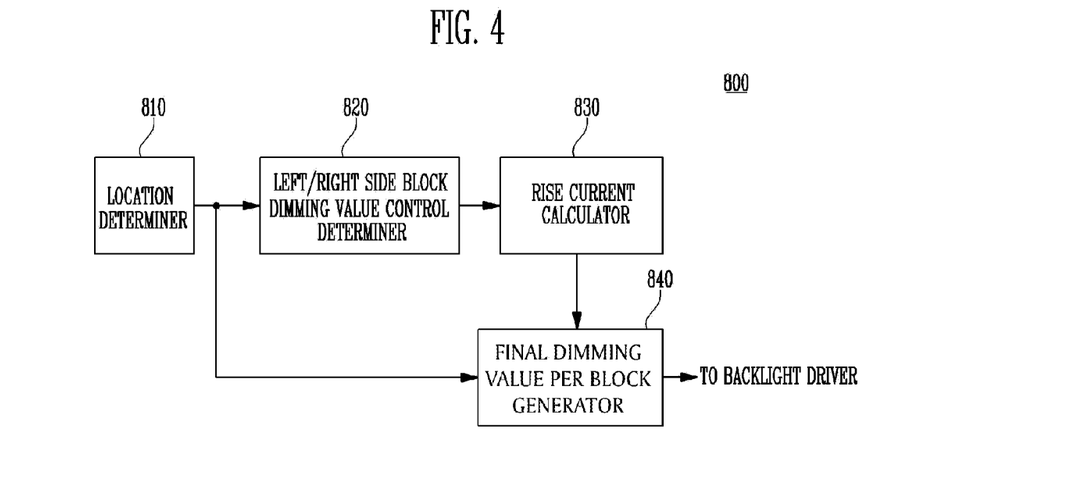
FIG. 4 is a view illustrating a detailed block diagram of a backlight controller of FIG. 1.

FIG. 4 is a view illustrating a detailed block diagram of a backlight controller of FIG. 1.

Referring to FIGS. 1 and 4, the backlight controller 800 includes a location determiner 810 configured to determine a location of a user (i.e., viewer) according to a result sensed by the user location sensor 700, a left/right side block dimming value determiner 820 configured to determine whether or not to control a left and/or right side block of the liquid crystal display panel 100 according to a result of the determination by the location determiner 810, a rise current calculator 830 configured to calculate a rise current corresponding to a block of the liquid crystal display panel 100 for which it has been determined to control the dimming value, and a final dimming value per block generator 840 configured to output a final dimming value of each block reflecting the user's location.

The location determiner 810 compares a result sensed by the user location sensor 700 with first and second reference values so as to determine the user location according to a result of the comparison. Herein, the sensed result provided from the user's location sensor 700 may be an angle between the liquid crystal display panel 100 and the user's eye.

The user location sensor 700 outputs 90° when the user's eye is perpendicular to the liquid crystal display panel 100, outputs 0° when the user's eye is in line with a left side of the liquid crystal display panel 100, and outputs 180° when the user's eye is in line with a right side of the liquid crystal display panel 100. That is, depending on the user's location, the user location sensor 700 outputs an angle between 0° and 180°, and provides this angle to the location determiner 810.

Herein, a first reference value of the location determiner 810 may be set to 75°, and a second reference value may be set to 105°.

When the angle ($\theta$) provided from the user location sensor 700 is between the first and second reference values (75°<$\theta$<105°), the location determiner 810 determines that the user is on a front side of the liquid crystal display panel 100.

Furthermore, when the angle ($\theta$) provided from the user location sensor 700 is smaller than the first reference value) ($\theta \leq 75°$, the location determiner 810 determines that the user is on a left side of the liquid crystal display panel 100. Moreover, when the angle (θ) provided from the user location sensor 700 is greater than the second reference value (θ>105°), the location determiner 810 determines that the user is on a right side of the liquid crystal display panel 100.

A result of determination of the user's location made in the location determiner 810 as aforementioned is provided to the left/right side block dimming value control determiner 820 and the final dimming value per block generator 840.

The left/right side block dimming value control determiner 820 determines whether or not to control a dimming value of each block (1~8) of the liquid crystal display panel according to the result of determination of the location determiner 810.

For example, when provided with a result of determination that the user is located on a left side of the liquid crystal display panel 100 from the location determiner 810, the left/right side block dimming value control determiner 820 determines to control dimming values of a fifth to eight blocks (5~8) that are blocks on the right side of the liquid crystal display panel 100.

Furthermore, when provided with a result of determination that the user is located on a right side of the liquid crystal display panel 100 from the location determiner 810, the left/right side block dimming value control determiner 820 determines to control the dimming values of a first to fourth blocks (1~4) that are blocks on the left side of the liquid crystal display panel 100.

When provided with a result of determination that the user is located on a front side of the liquid crystal display panel 100 from the location determiner 810, the left/right side block dimming value control determiner 820 determines not to control a dimming value of each block of the liquid crystal display panel 100.

Such a result of determination by the left/right side block dimming value control determiner 820 is provided to the rise current calculator 830.

The rise current calculator 830 calculates a rise current for increasing a driving current of a light emitting diode package (210b of FIG. 3) corresponding to a subject block in order to increase a brightness of the subject block for which it has been determined to control the dimming value.

The rise current calculator 830 calculates a rise current (Iup) of the subject block using math formula 1 and math formula 2 presented below.

$$Iup=(Imax-Inormal)/90\times(90-\theta) \quad \text{[Math formula 1]}$$

$$Iup=(Imax-Inormal)/90\times(\theta-90) \quad \text{[Math formula 2]}$$

Herein, Iup represents a rise current of each block, Imax represents a maximum driving current of each block, and θ represents a user's location.

Math formula 1 is for when the user is located on a left side of the liquid crystal display panel 100, and math formula 2 is for when the user is located on a right side of the liquid crystal display panel 100.

For example, when the user is located on a left side of the liquid crystal display panel 100, the rise current calculator 830 calculates a rise current (Iup) of right side blocks (5~8) of the liquid crystal display panel 100 using math formula 1. Furthermore, when the user is located on a right side of the liquid crystal display panel 100, the rise current calculator 830 calculates a rise current (Iup) of left side blocks (1~4) of the liquid crystal display panel 100 using math formula 2.

The rising current (Iup) of each block calculated as aforementioned is provided to the final dimming value per block generator 840.

The final dimming value per block generator 840 generates a final dimming value of each block (1~8) of the liquid crystal display panel 100 reflecting the user's location provided from the location determiner 810 therein and the rise current of each block provided from the rise current calculator 830, and provides the generated final dimming value to the backlight driver (300 of FIG. 1.)

Specifically, when the user is located on a front side of the liquid crystal display panel 100, the final dimming value per block generator 840 generates a same normal dimming value for first to eighth blocks (1~8) of the liquid crystal display panel 100, and provides the same normal dimming value to the backlight driver 300.

When the user is located on a left side of the liquid crystal display panel 100, the final dimming value per block generator 840 generates a final dimming value for first to eight blocks (1~8) of the liquid crystal display panel 100 reflecting the rise current (Iup) of the right side block provided from the rise current calculator 830 therein.

The final dimming values of fifth to eight blocks (5~8) that are right side blocks of the liquid crystal display panel 100 are set such that a brightness of a block has a higher brightness as it gets further away from the user.

For example, a final dimming value of the fifth block (5) of the liquid crystal display panel 100 may be calculated by reflecting 25% of the rise current (Iup) in the normal dimming value, a final dimming value of the sixth block (6) of the liquid crystal display panel 100 may be calculated by reflecting 50% of the rise current (Iup) in the normal dimming value, a final dimming value of the seventh block (7) of the liquid crystal display panel 100 may be calculated by reflecting 75% of the rise current (Iup) in the normal dimming value, and a final dimming value of the eighth block (8) of the liquid crystal display panel 100 may be calculated by reflecting 100% of the rise current (Iup) in the normal dimming value.

Herein, final dimming values of first to fourth blocks (1~4) that are left side blocks of the liquid crystal display panel 100 are normal dimming values.

When the user is located on a right side of the liquid crystal display panel 100, the final dimming value per block generator 840 generates final dimming values of first to eight blocks (1~8) of the liquid crystal display panel 100, reflecting the rise current (Iup) value of the left side block provided from the rise current calculator 830 therein.

The final dimming values of the first to fourth blocks (1~4) that are left side blocks of the liquid crystal display panel 100 are set such that a brightness of a block has a higher brightness as it gets further away from the user.

For example, a final dimming value of the first block (1) of the liquid crystal display panel 100 may be calculated by reflecting 100% of the rise current (Iup) in the normal dimming value, a final dimming value of the second block (2) of the liquid crystal display panel 100 may be calculated by reflecting 75% to the rise current (Iup) in the normal dimming value, a final dimming value of the third block (3) of the liquid crystal display panel 100 may be calculated by reflecting 50% of the rise current (Iup) in the normal dimming value, and a final dimming value of the fourth block (4) of the liquid crystal display panel 100 may be calculated by reflecting 25% of the rise current (Iup) in the normal dimming value.

Herein, final dimming values of fifth to eighth blocks (5~8) that are right side blocks of the liquid crystal display panel 100 are normal dimming values.

As aforementioned, the final dimming value generated in the final dimming value per block generator 840 is provided to the backlight driver 300, and then the backlight driver 300 generates a backlight driving current corresponding to the final dimming value provided and drives the light emitting diode packet (210b of FIG. 2) provided in the backlight unit 200.

When the user is located on a front side of the liquid crystal display panel 100, the backlight controller 800 including such a configuration generates a normal dimming value, and provides the normal dimming value to the backlight driver 300.

When the user is located on a left side of the liquid crystal display panel 100, the backlight controller 800 generates a final dimming value that increases the brightness of the right side blocks (fifth to eighth blocks, 5~8) of the liquid crystal display panel 100, and provides the final dimming value to the backlight driver 300. When the user is located on a right side of the liquid crystal display panel 100, the backlight controller 800 generates a final dimming value that increases the brightness of the left side blocks (first to fourth blocks, 1~4) of the liquid crystal display panel 100, and provides the final dimming value to the backlight driver 300.

Consequently, as the backlight controller 800 controls the brightness of each block (1~8) of the liquid crystal display panel 100 depending on the user's location, it becomes possible for the user to perceive a more uniform brightness across the liquid crystal display panel.

Meanwhile, when a liquid crystal display device according to an embodiment of the present invention is a mobile display device such as a mobile phone, the backlight controller 800 may increase the brightness of each block of the liquid crystal display panel except for when the user's location is at a front of the liquid crystal display panel.

Figure 5:
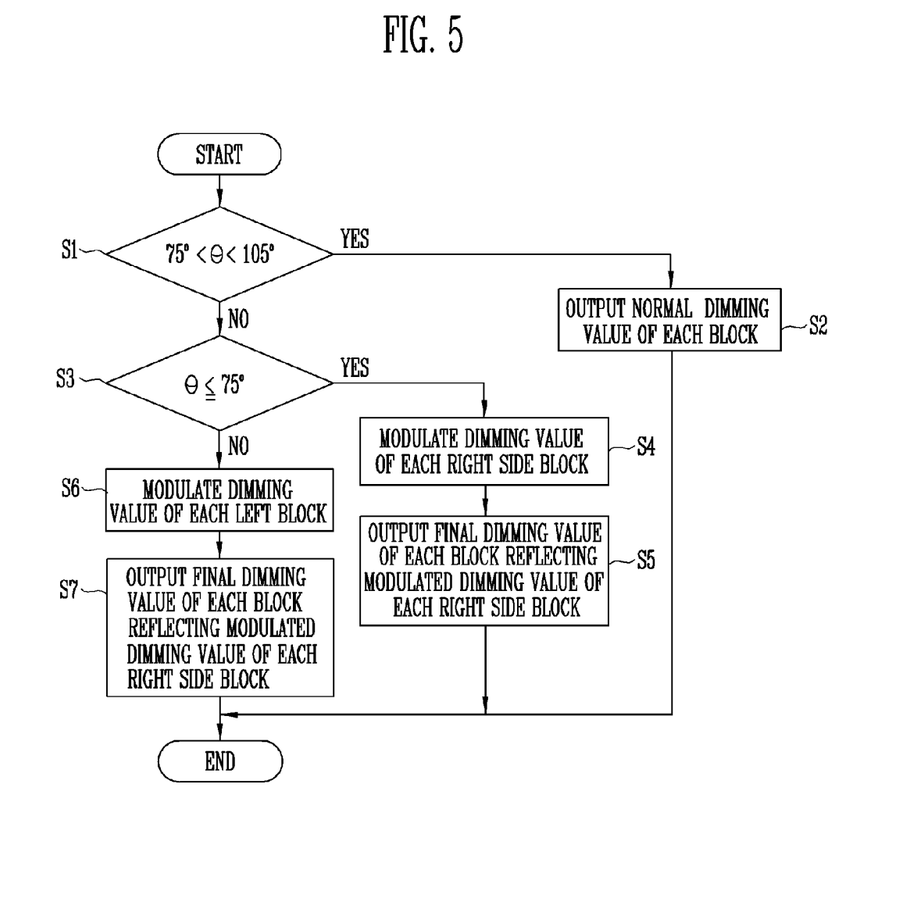
FIG. 5 is a flow chart of operations of driving the backlight controller of FIG. 4.

FIG. 5 is a flow chart of operations of driving the backlight controller of FIG. 4.

Referring to FIGS. 4 and 5, the backlight controller 800 determines whether or not an angle (θ) between the user's eye and the liquid crystal display panel (100 of FIG. 1) is between 75° and 105° (S1).

If the angle (θ) between the user's eye and the liquid crystal display panel is between 75° and 105°, the backlight controller 800 outputs a normal dimming value of each block of the liquid crystal display panel 100 (S2).

The backlight controller 800 determines whether or not the angle (θ) between the user's eye and the liquid crystal display panel 100 is smaller than 75° (S3). If the angle (θ) is smaller than 75°, the backlight controller 800 modulates a dimming value of a right side block of the liquid crystal display panel 100 (S4). Then, the backlight controller 800 outputs a final dimming value of each of all the blocks of the liquid crystal display panel 100 reflecting the modulated dimming value of the right block therein (S5).

Furthermore, if the angle (θ) between the user's eye and the liquid crystal display panel 100 is neither of the aforementioned, the backlight controller 800 modulates a left side block of the liquid crystal display panel 100 (S6). Then, the backlight controller 800 outputs a final dimming value of each of the blocks of the liquid crystal display panel 100 reflecting the modulated dimming value of the left side block therein (S7).

Figure 6A:
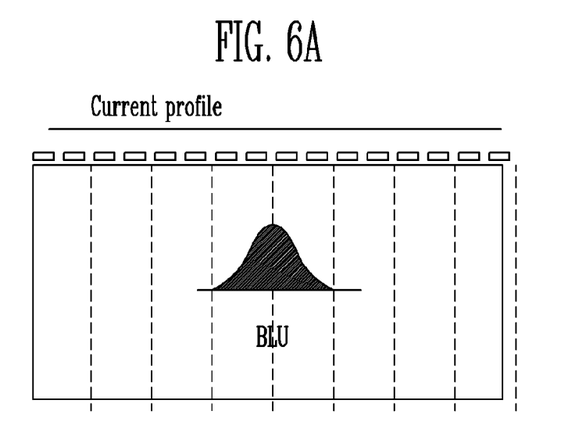
FIGS. 6A thru 6C are graphs illustrating a driving current profile of each block of a backlight unit (BLU) provided in a liquid crystal display module according to a user's location.
Figure 6B:
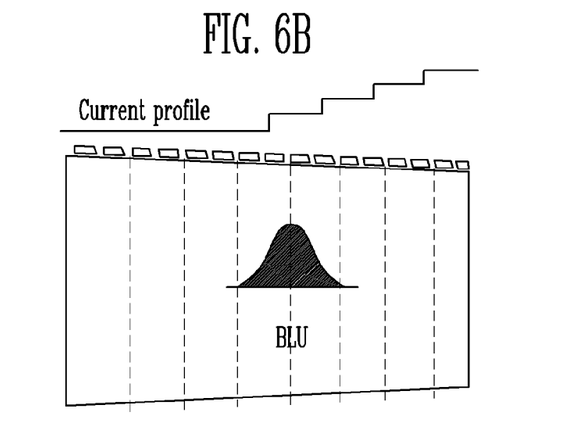
Figure 6C:
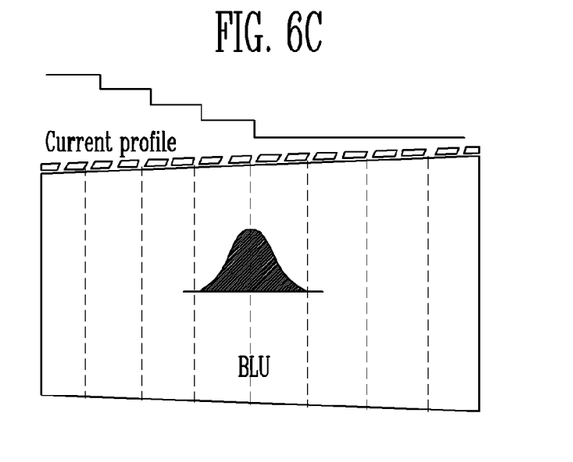

FIG. 6A thru 6C are graphs illustrating a driving current profile of each block of a backlight unit (BLU) provided in a liquid crystal display module according to a location of a user.

First of all, FIG. 6A is a view illustrating a driving current profile provided to the backlight unit (BLU) when the user is located on a front side of the backlight unit (BLU). As illustrated in FIG. 6A, when the user is located on a front side of the backlight unit (BLU), a driving current of a same size is provided to each of the blocks of the backlight unit (BLU).

FIG. 6B is a view illustrating a driving current profile provided to the backlight unit (BLU) when the user is located on a left side of the backlight unit (BLU). It can be seen that, compared to FIG. 6A, the driving current is increased at the right side block of the backlight unit (BLU).

FIG. 6C is a view illustrating a driving current profile provided to the backlight unit (BLU) when the user is located on a right side of the backlight unit (BLU). It can be seen that, compared to FIG. 6A, the driving current is increased at the left side block of the backlight unit (BLU).

According to the embodiment of the present invention, the aforementioned is to sense the location of the user watching the liquid crystal display panel, increase the driving current provided to the block of the backlight unit (BLU) opposite to the user's location to increase the brightness, thereby allowing the user to perceive a more uniform brightness across the display panel regardless of the user's location.

By way of summation and review, in an edge type backlight unit having an optical pattern formed under a light guide panel, reflection is made in a certain restricted direction, thereby providing excellent front brightness but non-uniform optical distribution having insufficient uniformity of brightness.

Especially, in a case where a light emitting diode (LED) having an excellent light straightness is used as a light source of the backlight unit, when light emitted from the light source hits an optical pattern on the light guide panel, the path of the light of the hit part is immediately converted into a front emission, thereby providing great brightness, but the brightness in the hit part and the brightness in the non-hit part may increase significantly, deteriorating the uniformity of the brightness.

Furthermore, when a viewer watches a liquid crystal display module having such a backlight unit, a brightness deviation may be perceived depending on whether or not the viewer is located on a front side or at left or right sides of the display panel.

A liquid crystal display device according to an embodiment of the present invention is capable of sensing an angle between a user and the liquid crystal display panel (or backlight unit) to identify the user's location with respect to the display panel, and to control a brightness of each block of the liquid crystal display panel according to the user's location, thereby allowing the viewer to perceive a more uniform brightness across the display panel regardless of the user's location.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics and/or elements described in connection with a particular embodiment may be used singly or in combination with features, characteristics and/or elements described in connection with other embodiments unless otherwise specifically indicated. Accordingly, it will be understood by those of skill in the art that various changes in form and detail may be made without departing from the spirit and scope of the present disclosure as set forth in the following claims.

What is claimed is:

1. A liquid crystal display device, comprising:
   a liquid crystal display panel;
   a backlight unit, including an optical assembly, to differentiate the liquid crystal display panel into a plurality of blocks and to independently control illumination light of each of the plurality of blocks;
   a location sensor to sense a location of a user watching the liquid crystal display panel;
   a backlight controller to output a final dimming value corresponding to a brightness of each of the plurality of blocks according to the sensed location of the user, wherein the backlight controller comprises:
      a location determiner to determine the user's location including left side or right side information with respect to the display panel by comparing the result of sensing sensed by the location sensor with a reference value;
      a left/right side block dimming value control determiner to determine whether or not to control a dimming value of the backlight unit corresponding to a left side or right side block of the liquid crystal display panel according to the user's left or right side, respectively determined by the location determiner;
      a rise current calculator to calculate a rise current Iup of the corresponding block according to a result of determination by the left/right side block dimming value control determiner using math formula 1: Iup=(Imax−Inormal)/90×(90−θ) and math formula 2: Iup=(Imax−Inormal)/90×(θ−90), a maximum current of each block of the liquid crystal display panel being Imax, an average current of the each block being Inormal, and the user's location being θ; and
      a final dimming value per block generator to generate the final dimming value of each of the plurality of blocks reflecting a value calculated by the rise current calculator; and
   a backlight driver to generate a driving current corresponding to the final dimming value of each block and to provide the generated driving current to the backlight unit corresponding to each of the plurality of blocks, the liquid crystal display panel being interposed between the user and the backlight unit to receive light output from the backlight unit and to produce images therefrom that are viewable by the user.

2. The liquid crystal display device of claim 1, wherein the optical assembly comprises:
   a plurality of light source units including at least one light emitting device to emit light;
   a light guide panel comprising an incident surface where light is received from the light source units, an exit surface emitting the light to the liquid crystal display panel, the liquid crystal display panel facing the exit surface, the light guide panel further comprising a rear surface where a plurality of optical patterns are formed; and
   an optical sheet arranged on an upper part of the light guide panel to change characteristics of the light emitted from the light guide panel.

3. The liquid crystal display device of claim 2, wherein the optical pattern comprises a micro lens pattern.

4. The liquid crystal display device of claim 1, wherein the location sensor comprises an eye tracking sensor to identify a location of the user's pupil.

5. The liquid crystal display device of claim 4, wherein the location sensor measures an angle between the user's pupil and the backlight unit using the eye tracking sensor.

6. The liquid crystal display device of claim 1, wherein the reference value comprises first and second reference values, the first reference value being 75° and the second reference value being 105°.

7. The liquid crystal display device of claim 1, wherein the rise current calculator calculates the rise current, Iup, using math formula 1 in response to the user being located on a left side of the liquid crystal display panel, and calculates the rise current, Iup, using math formula 2 in response to the user being located on a right side of the liquid crystal display panel.

8. The liquid crystal display device of claim 1, wherein the backlight controller increases a brightness of each block of the liquid crystal display panel corresponding to an opposite side of the user's location.

9. The liquid crystal display device of claim 1, wherein the backlight controller increases brightness of only some of the blocks of the liquid crystal display panel in response to the user watching the liquid crystal display panel from one of the left side and the right side.

10. The liquid crystal display device of claim 1, wherein the optical assembly comprises:
    a light guide panel having a first major surface opposite a second major surface, and a plurality of side surfaces connecting the second major surface to the first major surface, the first major surface facing the user and the liquid crystal display panel; and
    a light source that includes a plurality of light emitting diode packages arranged along a one of the side edges of the light guide panel to input light into the light guide panel, each of the light emitting diode packages corresponds to one of the plurality of blocks, each of the blocks corresponds to a different vertical strip of the liquid crystal display panel.

11. The liquid crystal display device of claim 10, wherein each of the light emitting diode packages composes two light sources.

12. The liquid crystal display device of claim 1, wherein the location sensor determines an angle between the user and a surface of the display panel, and the backlight controller and the backlight driver to control driving currents to the different blocks according to the determined angle.

13. The liquid crystal display device of claim 12, wherein rightmost of the blocks are driven at a higher current and are brightened when the user is arranged substantially left of a center of a front surface of the liquid crystal display panel, wherein leftmost of the blocks are driven at a higher current and are brightened when the user is arranged substantially to the right of the center of the front surface of the liquid crystal display panel, and wherein all of the blocks are driven normally when the user is arranged substantially in front of the center of the front surface of the liquid crystal display panel.

14. A method of driving a liquid crystal display device, comprising:
    providing a backlight controller that controls a backlight unit that illuminates a liquid crystal display panel within the liquid crystal display device;

differentiating the backlight unit corresponding to the liquid crystal display panel into a plurality of blocks that correspond to light source units used to illuminate the backlight unit;

sensing a location of a user watching the liquid crystal display panel with respect to the liquid crystal display panel;

determining, via a location determiner within the backlight controller, the user's location including left side or right side information with respect to the liquid crystal display panel by comparing a result of the sensing with a reference value;

determining whether or not to control a dimming value of the backlight unit corresponding to a left side or a right side of the liquid crystal display panel according to the user's left side or right side, respectively determined by the location determiner via a left/right side block dimming value control determiner of the backlight controller;

calculating a rise current Iup of the corresponding block according to a result of the determining by the left/right side block dimming value control determiner via a rise current calculator of the backlight controller using math formula 1: Iup=(Imax−Inormal)/90×(90−θ) and math formula 2: Iup=(Imax−Inormal)/90×(θ−90), a maximum current of each block of the liquid crystal display panel being Imax, an average current of the each block being Inormal, and the user's location being θ;

generating a final dimming value of each block reflecting the user's location via a final dimming value per block generator of the backlight controller;

outputting the final dimming value of each block corresponding to a brightness of each of the plurality of blocks according to the user's location with respect to the liquid crystal display panel;

generating a backlight driving current corresponding to the final dimming value of each block; and generating light according to the backlight driving current and providing the generated light to the liquid crystal display panel.

15. The method of claim 14, wherein the determining the user's location with respect to the liquid crystal display panel comprises identifying a location of the user's pupil and measuring angle θ between the user's pupil and the liquid crystal display panel.

16. The method of claim 15, wherein the reference value comprises first and second reference values, the first reference value being 75° and the second reference value being 105°.

17. The method of claim 15, wherein an illumination of the generated light of each block is adjusted according only to a location of the user with respect to the liquid crystal display panel and not according to a direction a user's eyes are directed, wherein when the user is detected as being substantially to the right side of the liquid crystal display panel, only blocks corresponding to the left side of the liquid crystal display panel are brightened, wherein when the user is detected as being substantially to the left side of the liquid crystal display panel, only blocks corresponding to the right side of the liquid crystal display panel are brightened, and when the user is detected as being in front of the central portion of the liquid crystal display panel, all of the blocks are driven normally to produce a normal brightness.

* * * * *